April 19, 1966  J. LEWIS  3,247,302
PROCESS FOR MANUFACTURING A PLURAL WALLED CONTAINER
Filed May 12, 1961
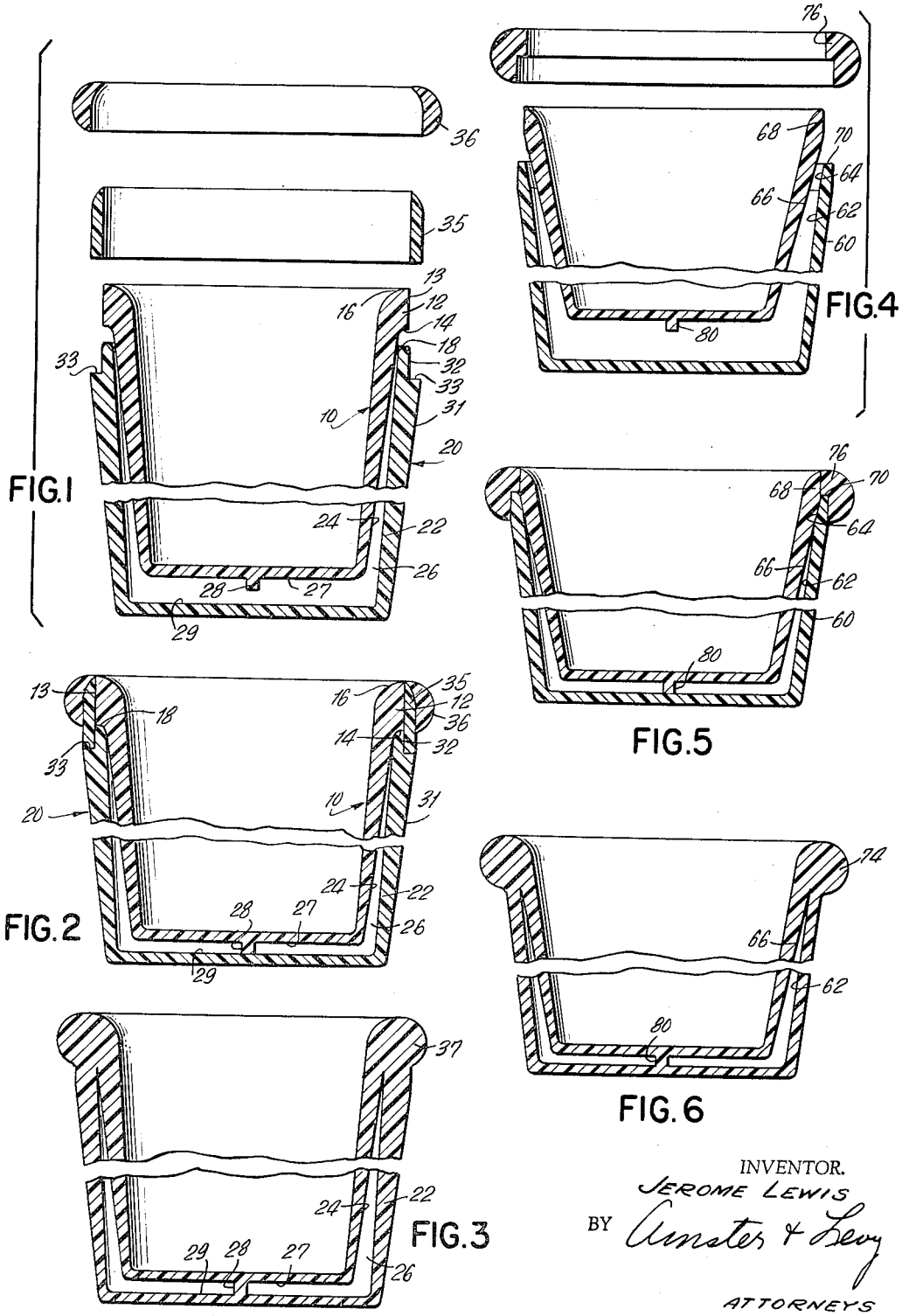
INVENTOR.
JEROME LEWIS
BY Amster & Levy
ATTORNEYS United States Patent Office 3,247,302
Patented Apr. 19, 1966

3,247,302
PROCESS FOR MANUFACTURING A PLURAL
WALLED CONTAINER
Jerome Lewis, 230 5th Ave., New York, N.Y.
Filed May 12, 1961, Ser. No. 109,565
1 Claim. (Cl. 264—248)

This application is a continuation-in-part of application Serial No. 51,087, filed August 22, 1960, now Patent No. 3,002,646.

This invention relates to the manufacture of plural walled containers.

In the past, thermoplastic material has been employed for molding or otherwise fabricating double walled containers. When transparent materials such as methyl methacrylate, polystyrene or the like are employed, seals of an adhesive material have been used to effect the closure between the inner and outer rectptacles of the double walled container which gives rise to a crazed or otherwise disfigured appearance to the double walled containers, and it is therefore an object of the present invention to fabricate a plural walled container which will enable various transparent synthetic materials to be employed and where a more attractive finished product can be attained.

Various types of double walled containers having seals between the inner and outer receptacles which employ adhesive material have been found to be unsatisfactory because after use and subsequent washing, minor cracks in the seals often result, especially if these thermoplastic containers are washed in a dish washer which results in washing fluid entering through such cracks into the space between the inner and outer receptacles rendered the container unsatisfactory for further use.

It is therefore another object of the present invention to fabricate a plural walled container which is provided with means which prevent the penetration of fluid into the space between the inner and outer receptacles except upon actual cracking of the container structure itself and which further results in a much stronger container.

In carrying out the invention, a new departure from the art of making double walled plastic containers is employed which includes the application of a lip structure hemispherical shaped in cross section which is molded about the previously arranged inner and outer receptacles so as to provide a unitary construction.

Double walled containers having dead air spaces between the inner and outer receptacles thereof are subjected to great internal pressures when the containers have hot or cold drinks placed therein. The air in these spaces expands or contracts depending upon thermal conditions. It has been attempted either to evacuate these spaces or to provide a removable plug, but neither of these solutions is completely satisfactory. The present invention overcomes the tendency of the container to bulge or collapse by providing a rib or projection integrally molded with the inner container that becomes fused to the outer container during the step of molding the lip structure of the container.

Further, when fusing a lip structure about inner and outer receptacles, when the completed container is withdrawn from the mold, the heated air trapped in the dead air space contracts, often causing the completed container to collapse. It is therefore a further object of the invention to provide means integrally interconnecting the bottoms of inner and outer receptacles so as to prevent these parts from collapsing after the completed container has been withdrawn from the mold and allowed to cool.

Still further objects and features of the invention reside in the provision of a plural walled container that is simple to fabricate, capable of being molded out of readily available materials into various types of containers such as dishes, pitchers, tumblers, milk and cocktail shakers, cups, plates or trays, urns, pots, and such other configurations which may be desired and which allows for use in the home and factory, and which is especially adapted for shipboard use since the containers are substantially indestructible and will not crack or break upon falling, and which containers are ideal for use in aircraft since they are extremely light in weight and insulate hot or cold eatables or beverages, rendering the container safe to grasp should there be sudden motion of the aircraft.

These, together with the various ancillary objects and features of the invention which will become apparent as the following description proceeds, are attained by this plural walled container and process of manufacturing thereof, preferred embodiments of the container being shown in the accompanying drawing, by way of example only, wherein:

FIG. 1 is an exploded sectional view of the inner and outer receptacles of the plural walled container;

FIG. 2 is a sectional detail view of the invention in an intermediate stage of manufacture;

FIG. 3 is a sectional view of a finished container;

FIG. 4 is a view similar to that of FIG. 1 but illustrating a modified form of the invention having a different lip structure;

FIG. 5 is a sectional detail view of the invention in an intermediate stage of manufacture; and FIG. 6 is a sectional view of the finished modified form of the invention.

With continuing reference to the accompanying drawing wherein like reference numerals are used to designate similar parts throughout the several views and with initial attention directed to FIGS. 1 through 3, reference numeral 10 generally designates an inner receptacle of a thermoplastic material such as methyl methacrylate, polystyrene, polyvinylchloride or the like of any suitable shape so as to form part of a plural walled dish, pitcher, tumbler, shaker, plate, urn, pot, cup or the like and is provided with an upper overhang portion 12 having on the underside 14 thereof a substantially horizontal surface and being provided with a rounded upper surface 16.

The inner receptacle 10 is preferably of a tapered shape for conveniently molding such structure and is of a comparatively thin wall construction, the thickness of the wall being exaggerated in the drawing for the sake of clarity.

The bottom edge of the overhang 14 is adapted to provide a substantially fluid-tight fit with the top edge 18 of an outer receptacle 20 formed of an identical substance to that of the receptacle 10. The outer receptacle 20 has its inner wall 22 of slightly larger diameter than the diameter of the outer wall 24 of the inner receptacle 10, so as to form a space therebetween, as seen at 26.

This air space 26 is a closed air space and, thus, provides very satisfactory insulation for the inner receptacle 10 and the contents of the inner receptacle 10. Projection 28 is integrally formed with the bottom 27 of the inner receptacle 10 and rests on the bottom 29 of the outer receptacle 20. This rib 28 prevents the collapse of the bottoms 27 and 29 together during molding operations to be hereinafter described.

The outer wall 31 of the outer receptacle is provided with a peripheral groove 32 opening into the top of the outer receptacle and forming a shoulder 33 for reception of plastic material shown schematically in FIGS. 1 and 2 as rings of material. This material is never actually formed into rings but the material designated at 35 and 36 is fused in its plastic state to the inner and outer receptacles.

It is to be recognized that the inner receptacle 10, the outer receptacle 20, or both may be made transparent, as desired.

After the parts have been assembled to the state shown in FIG. 2, the assembled inner and outer receptacles are placed in a mold, whereby additional material identical with that of the material from which both the inner receptacle 10 and outer receptacle 20 are formed, is then molded about the receptacles. Such additional material of a thermoplastic nature is indicated schematically by the rings 35 and 36 and unites integrally with the material of the outer receptacle 20 and with the side wall 13 of the overhang portion 12 of the inner receptacle 10 with the material flowing into and becoming unitary with the material of the overhang portion, so that there is no joint or seal formed but a monolithic construction.

Because of the fact that the edge 18 engages the edge 14, such will remain in airtight contact and become fused with each other without a separate seal and no crazing or distortion will be apparent.

The amount of material molded about the inner and outer container and indicated schematically by rings 35 and 36 is preferably selected so that a lip structure 37 of substantially hemispherical cross sectional shape is produced with the lip structure 37 extending well beyond the inner and outer receptacles. Of course, the material shown schematically by ring 36 could possibly be eliminated so as to eliminate the lip structure 37, but this would reduce the desirability of the finished product.

In FIGS. 4 through 6 there is shown an arrangement of parts where the outer receptacle 60 has the inner wall 62 provided with a beveled upper edge against which a tapered medial portion of the outer wall 66 of the inner receptacle abuts in airtight relationship. The upper portion 68 of the inner receptacle extends above the top edge 70 of the outer receptacle 60 so that it forms a shoulder against which the material to be molded thereon to form the lip structure 74 which is hemispherical in cross sectional shape, the material being schematically illustrated by ring 76.

After the inner and outer receptacles are assembled, they are placed in a mold and the material which will form the lip structure flows in a molten state thereabout integrally fusing with both the inner and outer receptacles. At the same time, in the mold the rib 80 integrally molded with the inner receptacle becomes heat sealed and integrally fused with the outer receptacle due to the presence of heat and this rib prevents the collapse of the bottoms of the containers when the assembled container is allowed to cool and the air entrapped therein forms a partial vacuum.

Thus it can be seen that there has been defined a process of manufacturing a plural walled container, which comprises the steps of arranging an inner receptacle 10 within an outer receptacle 20, then placing the arranged receptacles in a mold, so that a thermoplastic material can be molded about the receptacles with the plastic material fusing with the receptacles, so that there is produced a plural walled container having an inner receptacle, an outer receptacle, and lip structure formed of plastic material fused to both the outer receptacle and the inner receptacle.

A latitude of modification, change and substitution is intended in the foregoing disclosure and in some instances some features of the invention will be employed without a corresponding use of other features. Accordingly, it is appropriate that the appended claim be construed broadly and in a manner consistent with the spirit and scope of the invention herein.

What I claim is:

A process of manufacturing a plural walled container comprising the steps of arranging an inner receptacle of thermoplastic material having a downwardly extending projection within an outer receptacle of similar material in spaced relationship to each other for substantially the entire opposed surfaces thereof with said projection resting on said outer receptacle and with the upper edge of said outer receptacle engaging said inner receptacle at a side location spaced a considerable distance from the top of said inner receptacle to define a closed insulating space between said inner and outer receptacles, said outer receptacle having a peripheral groove in the outer wall thereof opening into the top of said outer receptacle and forming a shoulder, placing said arranged inner and outer receptacles in a mold, introducing into said mold in a plastic state an amount of thermoplastic material similar to that of said receptacles, molding said amount of thermoplastic material about said arranged receptacles with said plastic material being received in said groove and on said shoulder and flowing into and fusing with said receptacles in the form of a lip structure of substantially hemispherical cross sectional shape, while simultaneously fusing said projection to said outer receptacle.

References Cited by the Examiner

UNITED STATES PATENTS

| | | | |
|---|---|---|---|
| 1,309,757 | 7/1919 | Kempton | 18—59 |
| 2,051,446 | 8/1936 | Ice | 215—13 |
| 2,439,716 | 4/1948 | Canfield et al. | 18—59 |
| 2,538,524 | 1/1951 | Joseph | 220—9 |
| 2,725,733 | 12/1955 | Davis | 215—13 |
| 2,948,430 | 8/1960 | Teague et al. | 220—9 |

FOREIGN PATENTS 1,200,522  12/1959  France.

ROBERT F. WHITE, *Primary Examiner.*

EARLE J. DRUMMOND, MORRIS LIEBMAN, ALEXANDER H. BRODMERKEL, *Examiners.*